United States Patent
Sugawara

(10) Patent No.: US 7,310,169 B2
(45) Date of Patent: Dec. 18, 2007

(54) IMAGE COMMUNICATION APPARATUS AND CONTROL METHOD THEREOF

(75) Inventor: Naoki Sugawara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 942 days.

(21) Appl. No.: 10/745,605

(22) Filed: Dec. 29, 2003

(65) Prior Publication Data

US 2004/0141215 A1 Jul. 22, 2004

(30) Foreign Application Priority Data

Jan. 17, 2003 (JP) ............................. 2003-010349

(51) Int. Cl.
*H04N 1/00* (2006.01)
(52) U.S. Cl. ..................... 358/437; 358/1.14
(58) Field of Classification Search ............... 358/1.14, 358/296, 400, 437, 498; 399/9–19
See application file for complete search history.

(56) References Cited

U.S. PATENT DOCUMENTS 6,101,576 A * 8/2000 Kobayashi et al. ......... 711/122

* cited by examiner

*Primary Examiner*—King Y. Poon
*Assistant Examiner*—Nathan K Tyler
(74) *Attorney, Agent, or Firm*—Fitzpatrick, Cella, Harper & Scinto

(57) ABSTRACT

An image communication apparatus aims to prevent that an original is damaged in case of sharing an edge sensor, a driving motor and a transportation roller in both a reading operation and a recording operation, and thus includes a control means. In a case where an operation state stored in a non-volatile memory is not "in-reading (i.e., the reading operation is being performed)" when a power supply is turned on, the control means controls to discharge a recording paper if the recording paper in question is detected by an original/recording paper detection means. On one hand, in a case where the operation state stored in the non-volatile memory is "in-reading", the control means controls not to discharge an original even if the original in question is detected by the original/recording paper detection means.

22 Claims, 4 Drawing Sheets

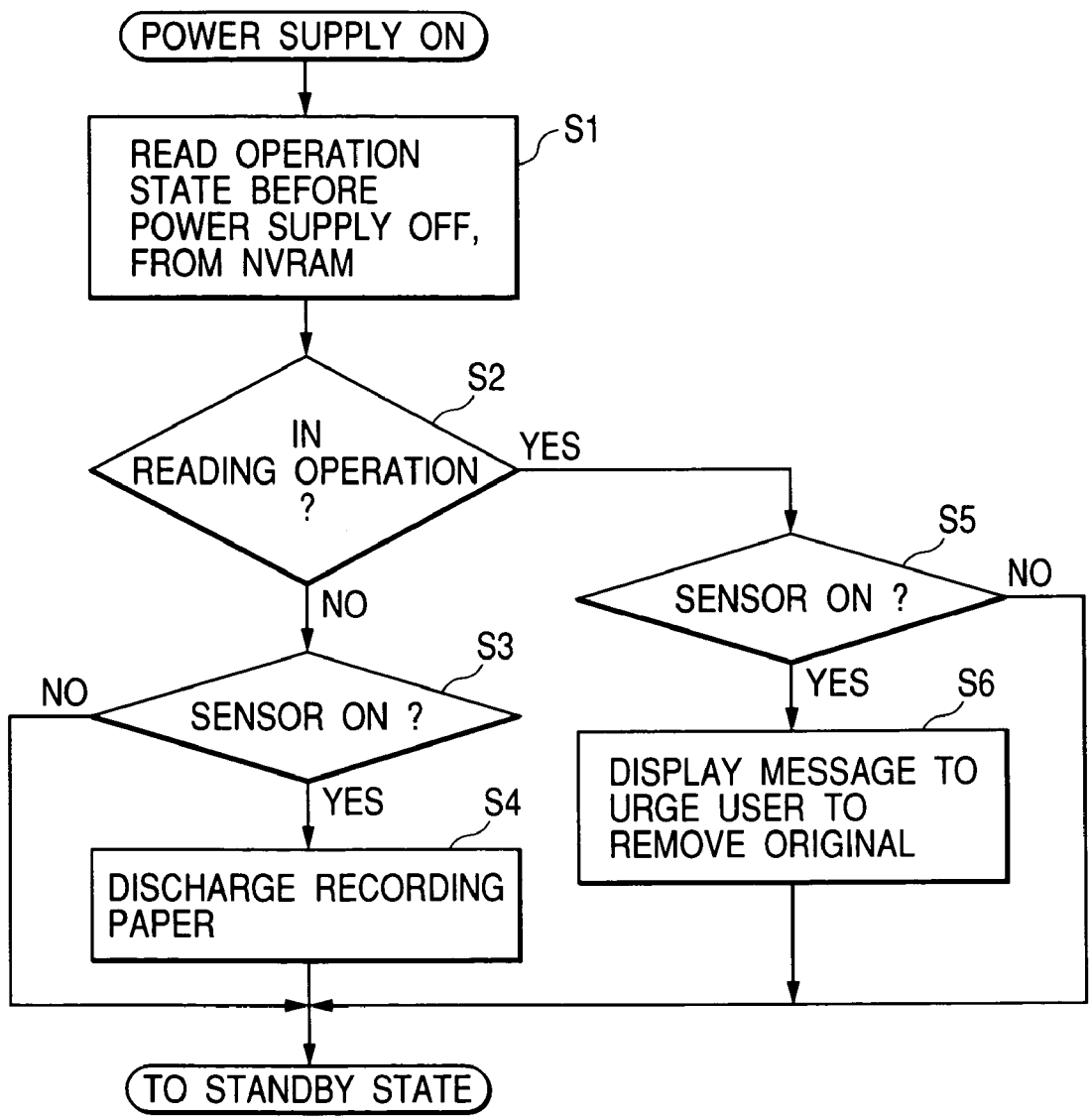

IMAGE COMMUNICATION APPARATUS AND CONTROL METHOD THEREOF

BACKGROUND OF THE INVENTION

1. Field of the Invention

The present invention relates to an image communication apparatus such as a facsimile machine or the like which is equipped with an original transportation path for transporting an original in a reading operation and a recording paper transportation path for transporting a recording paper in a recording operation, and to a control method for the image communication apparatus.

2. Related Background Art

In a conventional facsimile machine, an original transportation path for transporting an original in a reading operation and a recording paper transportation path for transporting a recording paper in a recording operation are completely separated from each other.

However, in the above conventional facsimile machine, it is necessary to provide an edge sensor, a driving motor and a transportation roller independently for each of the reading operation and the recording operation. For this reason, there is a problem that such a structure is disadvantageous in downsizing and cost-cutting.

Thus, to solve the above problem, it is considered to share the edge sensor, the driving motor and the transportation roller in both the reading operation and the recording operation.

Incidentally, in the conventional facsimile machine, in a case where a recording paper exists in a recording paper transportation mechanism when a power supply is turned on, it is controlled to automatically discharge the recording paper in question so as to restore its recordable state. On one hand, in a case where an original exists in an original transportation mechanism, it is controlled not to automatically discharge the original in question so as to prevent that the original is damaged by discharging it from the original transportation mechanism, that is, in view of protection of the original.

Incidentally, in case of sharing the edge sensor, the driving motor and the transportation roller in both the reading operation and the recording operation, if a paper exists in the original/recording paper transportation mechanism when the power supply is turned on, it is impossible to discriminate whether the paper in question is the recording paper or the original. Therefore, in this case, when the paper existing in the original/recording paper transportation mechanism is indiscriminately and forcibly discharged, if the existing paper is the original, a problem that the original in question is damaged occurs.

SUMMARY OF THE INVENTION

An object of the present invention is to provide an image communication apparatus which can prevent that an original is damaged even if an edge sensor, a driving motor and a transportation roller are shared for both a reading operation and a recording operation, and a control method for the image communication apparatus.

BRIEF DESCRIPTION OF THE DRAWINGS

FIG. 4 is a flow chart showing a control operation of the facsimile machine 100 in case of turning on a power supply.

DETAILED DESCRIPTION OF THE PREFERRED EMBODIMENT

Figure 1:
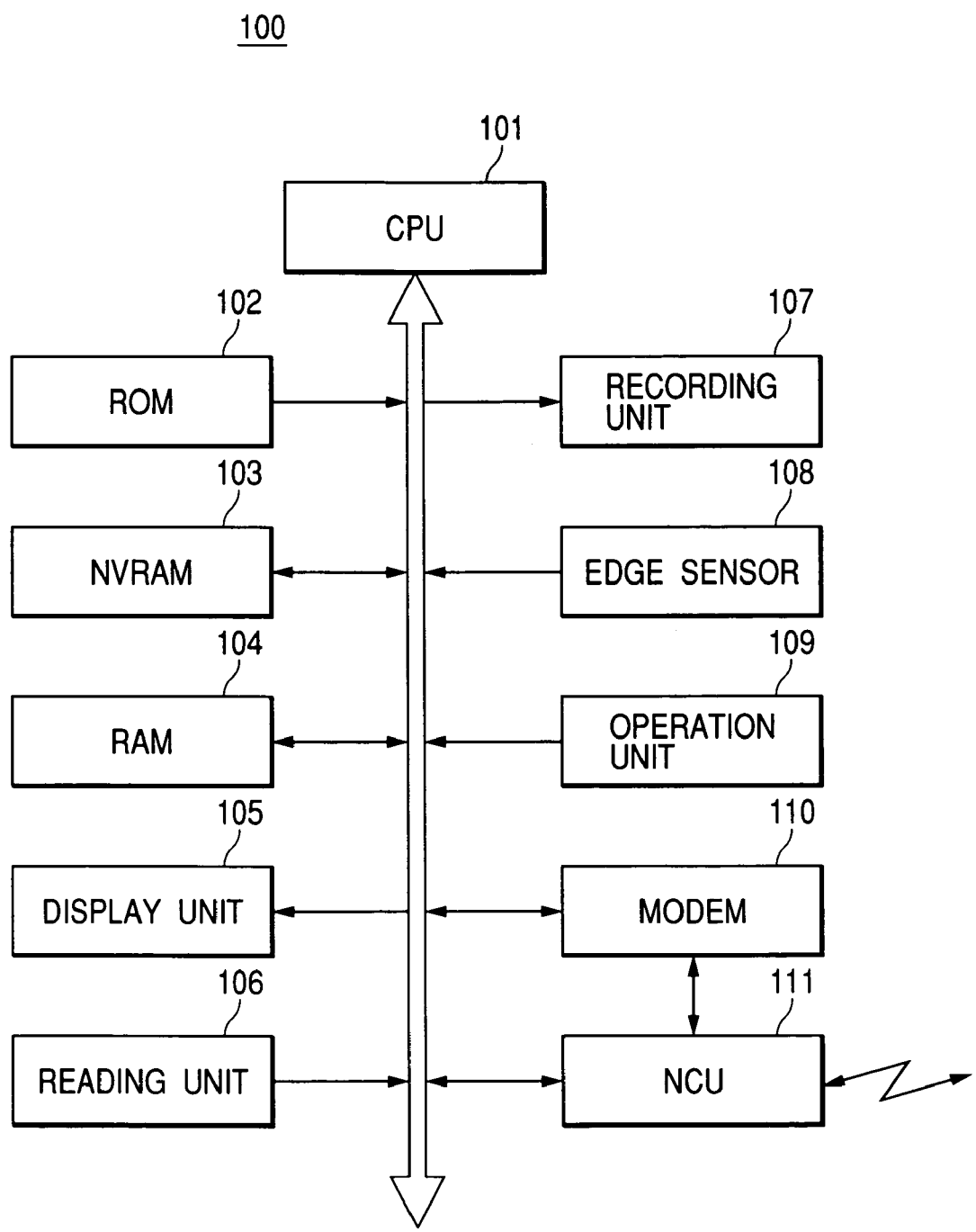
FIG. 1 is a block diagram showing the structure of a facsimile machine 100 according to the embodiment of the present invention.

FIG. 1 is a block diagram showing the structure of a facsimile machine 100 according to the embodiment of the present invention.

The facsimile machine 100 consists of a CPU 101, a ROM 102, an NVRAM (non-volatile RAM) 103, a RAM 104, a display unit 105, a reading unit 106, a recording unit 107, an edge sensor 108, an operation unit 109, a modem 110, and an NCU (network control unit) 111.

The CPU 101 controls the facsimile machine 100 as a whole. The ROM 102 is the memory which stores a control program and the like for the facsimile machine 100, and the NVRAM 103 is the non-volatile memory which stores various registration data and operation mode parameters. Here, it should be noted that the NVRAM 103 is backed up by a battery. The RAM 104 is the memory which stores image data and is used as a working memory necessary in various operations, and the display unit 105 is the display which displays the state of the facsimile machine 100 and the like.

The reading unit 106 is the reader which reads out an original in image transmission and image copying, and the recording unit 107 is the recorder which records a received image and an image read from a copy. The edge sensor 108 is the sensor by which it is detected whether or not a paper exists in an original/recording paper transportation mechanism, and the operation unit 109 which includes plural kinds of keys is the console or the like which is used to instruct various operations. The modem 110 is the device which encodes the image data read by the reading unit 106 and decodes the received image data, and the NCU 111 is the controller which performs network control to perform image data communication and transmission of pulse signals.

That is, the edge sensor 108 is an example of an edge sensor which detects the position of the original or a recording paper when a reading operation or a recording operation is performed. The CPU 101 is an example of an original/recording paper detection means which detects based on the output signal from the edge sensor 108 whether or not the original or the recording paper exists in the original/recording paper transportation mechanism.

The NVRAM 103 is an example of a non-volatile memory, and the CPU 101 is also an example of an operation state storage control means which causes the non-volatile memory to store the operation state of an image communication apparatus.

Moreover, the CPU 101 is also an example of a control means which performs the specific control as below. That is, when a power supply is turned on, in a case where the operation state stored in the non-volatile memory is not "in-reading (i.e., the reading operation is being performed)", it is controlled by the CPU 101 to discharge the recording paper if the recording paper in question is detected by the original/recording paper detection means. On one hand, in a case where the operation state stored in the non-volatile memory is "in-reading", it is controlled by the CPU 101 not to discharge the original even if the original in question is detected by the original/recording paper detection means.

Furthermore, the CPU 101 is also an example of a control means which performs the specific control as below. That is, when the power supply is turned on, in the case where the operation state stored in the non-volatile memory is not "in-reading", it is controlled by the CPU 101 to discharge the recording paper if the recording paper in question is detected by the original/recording paper detection means. On one hand, in the case where the operation state stored in the non-volatile memory is "in-reading", even if the original is detected by the original/recording paper detection means, it is controlled not to discharge the original, and it is also controlled to display a message to urge a user to eliminate the detected original.

Figure 2:
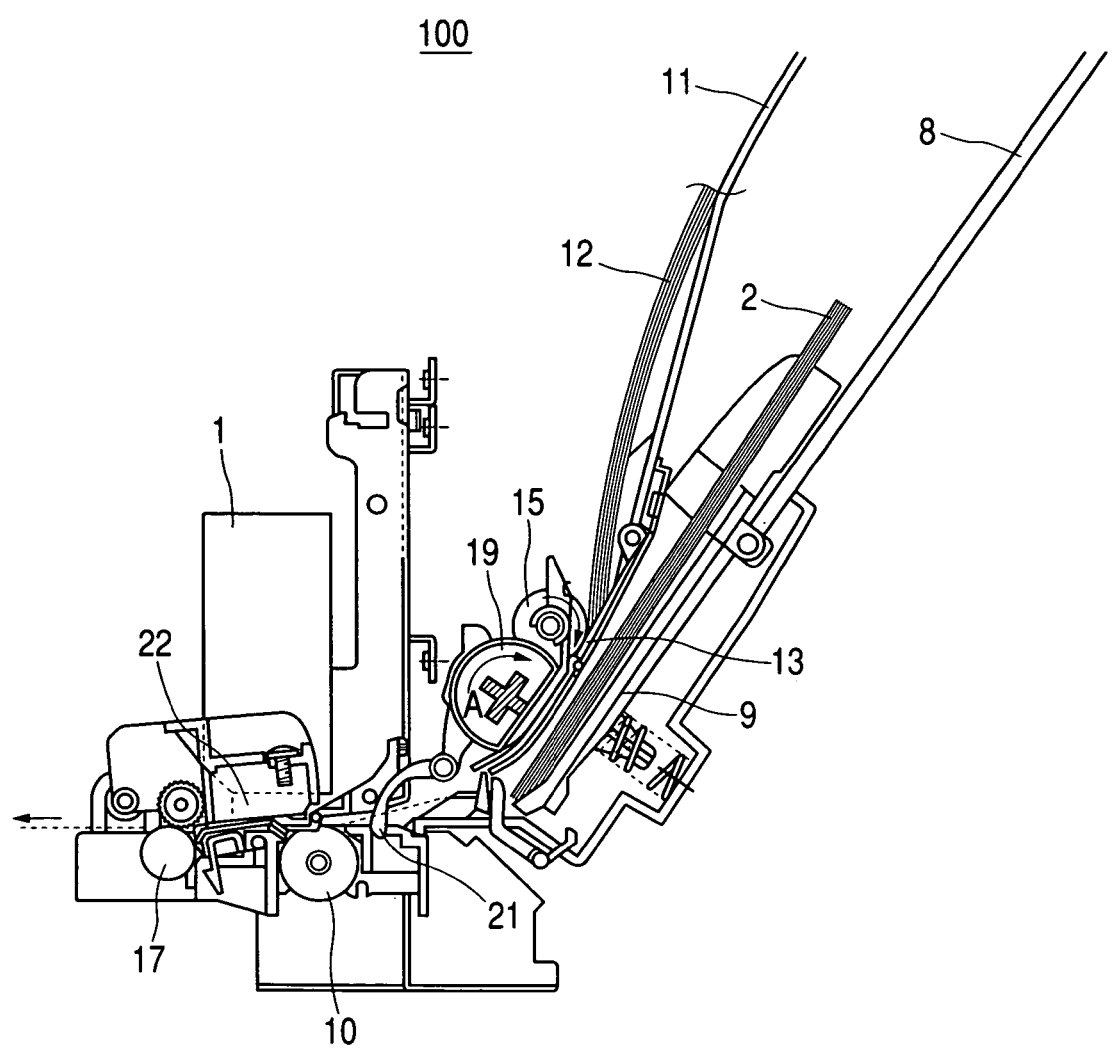
FIG. 2 is a mechanical diagram showing the structure of the facsimile machine 100.
Figure 3:
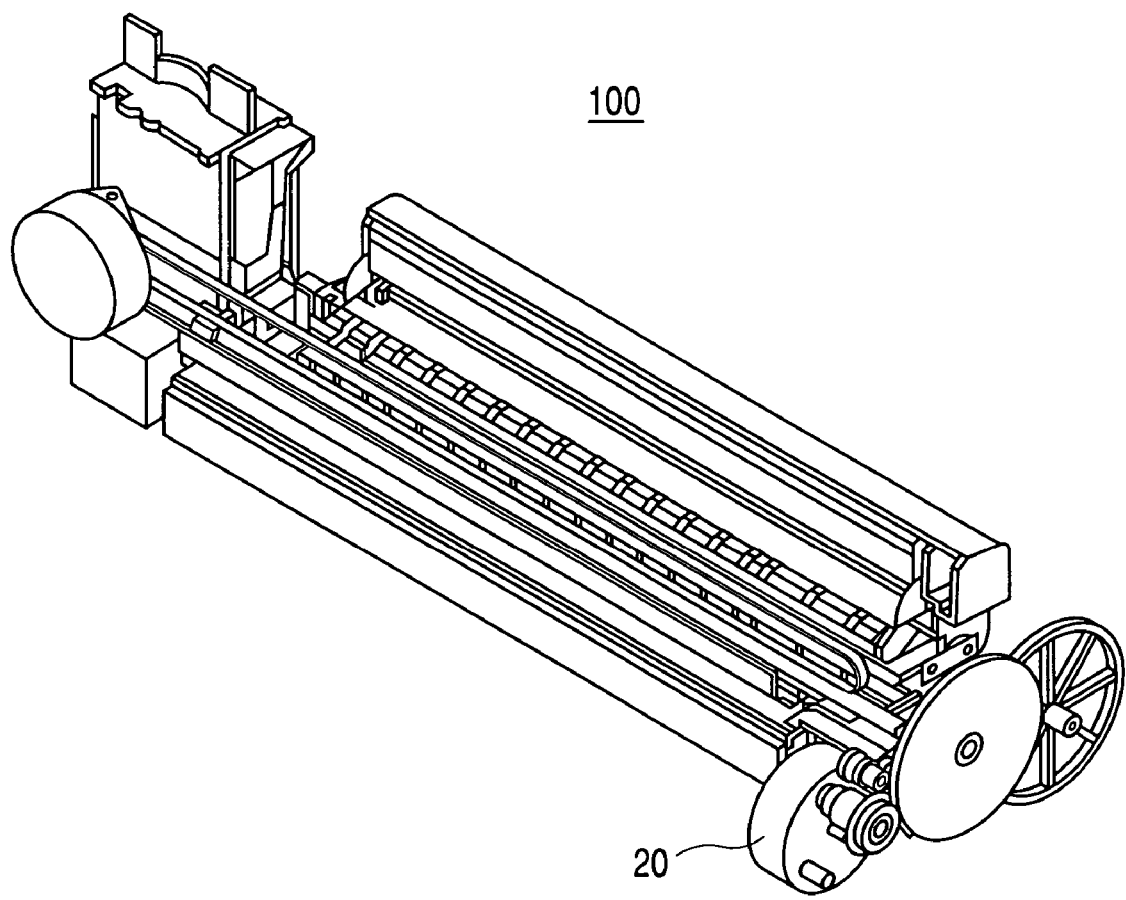
FIG. 3 is a mechanical diagram showing the structure of the facsimile machine 100.

FIGS. 2 and 3 are mechanical diagrams respectively showing the structure of the facsimile machine 100.

The facsimile machine 100 includes an actuator 21 connected to the edge sensor 108, a driving motor 20, and a transportation roller 10. Here, the actuator 21, the driving motor 20 and the transportation roller 10 are shared in both the reading operation and the recording operation.

The actuator 21, the driving motor 20 and the transportation roller 10 are an example of an original/recording paper transportation mechanism which is shared in both the reading operation and the recording operation, and transports the original or the recording paper when the reading operation or the recording operation is performed. Here, it should be noted that the original/recording paper transportation mechanism is structured by at least one of the actuator 21 connected to the edge sensor 108, the driving motor 20, and the transportation roller 10.

Next, the operation in the present embodiment will be explained.

When the copy operation is performed by the facsimile machine 100, the reading operation is first performed. Therefore, a code "01" indicating that the reading operation is being performed is written to the operation mode parameter stored in the NVRAM 103, and then the reading unit 106 reads out the original. That is, when an original 12 put on a tray 11 is transported by rotation of an original. separation roller 15, the actuator 21 is pushed up, whereby the edge sensor 108 is turned on. Then, when the original 12 is transported to the position of a CS (contact sensor) 22 through a path 13, a scanning operation is started, and the data read through the scanning operation is temporarily stored in the RAM 104.

When the trailing edge of the original 12 passes the actuator 21, the edge sensor 108 is turned off. Then, when the trailing edge of the original 12 reaches the position of the CS 22, the scanning operation is stopped, and the original 12 is discharged by a discharge roller 17.

Next, the recording operation is performed. Therefore, a code "02" indicating that the recording operation is being performed is written to the operation mode parameter stored in the NVRAM 103, and then the recording unit 107 performs the recording operation. That is, when a recording paper 2 put on a tray 8 is transported by rotation of a recording paper separation roller 19 in a direction A, the actuator 21 is pushed up, whereby the edge sensor 108 is turned on. Then, when the recording paper 2 is transported to the position of an ink cartridge 1 through a path 9, a printing operation of the image data stored in the RAM 104 is started. After then, when the trailing edge of the recording paper 2 passes the actuator 21, the edge sensor 108 is turned off. Subsequently, when the trailing edge of the recording paper 2 reaches the position of the ink cartridge 1, the printing operation is stopped, and the recording paper 2 is discharged by the discharge roller 17.

When the recording operation ends, the copy operation ends. Therefore, a code "00" indicating that the facsimile apparatus 100 is in a standby state is written to the operation mode parameter stored in the NVRAM 103.

Next, the control operation of the facsimile machine 100 in case of turning on the power supply will be explained.

FIG. 4 is a flow chart showing the control operation of the facsimile machine 100 in case of turning on the power supply.

When the power supply of the facsimile machine 100 is turned on, the operation state before the power supply is turned off is read from the NVRAM 103 (steps S1 and S2). Then, when the operation state before the power supply is turned off is not the code "01" indicating that the reading operation is being performed, the flow advances to a step S3 to check the state of the edge sensor 108. When the edge sensor 108 is on, this indicates that the recording paper exists in the original/recording paper transportation mechanism, whereby the recording paper is discharged (step S4). Then, the facsimile machine 100 comes to be in the standby state. On the contrary, when it is judged in the step S3 that the edge sensor 108 is off, the facsimile machine 100 comes to be in the standby state as it is.

On one hand, in the step S2, when the operation state (i.e., the operation state before the power supply is turned off) read from the NVRAM 103 is the code "01" indicating that the reading operation is being performed, the flow advances to a step S5 to check the state of the edge sensor 108. When the edge sensor 108 is on, a message "REMOVE ORIGINAL" is displayed on the display unit 105 (step S6), and the facsimile machine 100 comes to be in the standby state.

Here, unlike the operation in the step S4, the automatic discharge is not performed so as to prevent that the original is damaged by automatically discharging it when the original is jammed due to some reason. In any case, when it is judged in the step S5 that the edge sensor 108 is off, the facsimile machine 100 comes to be in the standby state as it is.

Incidentally, the above embodiment may be applied to an image communication apparatus other than the facsimile machine 100.

According to the above embodiment, it is possible to prevent that the original is damaged, even if the edge sensor, the driving motor and the transportation roller are shared for both the reading operation and the recording operation.

According to the present invention, in case of sharing the edge sensor, the driving motor and the transportation roller in both the reading operation and the recording operation, there is a significant effect that the damage of the original can be prevented.

What is claimed is:

1. An image communication apparatus comprising:
an edge sensor for detecting a position of an original or a recording paper when a reading operation or a recording operation is performed;
original/recording paper detection means for detecting, based on an output signal from said edge sensor, whether or not the original or the recording paper exists in an original/recording paper transportation mechanism;
a non-volatile memory;
operation state storage control means for causing said non-volatile memory to store an operation state of said image communication apparatus; and
control means for, in a case where the operation state stored in said non-volatile memory is not "in-reading" when a power supply is turned on, performing control to discharge the recording paper if the recording paper is detected by said original/recording paper detection means, and, in a case where the operation state stored in said non-volatile memory is "in-reading" when the power supply is turned on, performing control not to discharge the original even if the original is detected by said original/recording paper detection means.

2. An image communication apparatus according to claim 1, wherein said non-volatile memory is a memory which is backed up by a battery.

3. An image communication apparatus according to claim 1, wherein said image communication apparatus is a facsimile machine.

4. An image communication apparatus comprising:
an original/recording paper transportation mechanism for transporting an original or a recording paper when a reading operation or a recording operation is performed;
original/recording paper detection means for detecting whether or not the original or the recording paper exists in said original/recording paper transportation mechanism;
a non-volatile memory;
operation state storage control means for causing said non-volatile memory to store an operation state of said image communication apparatus; and
control means for, in a case where the operation state stored in said non-volatile memory is not "in-reading" when a power supply is turned on, performing control to discharge the recording paper if the recording paper is detected by said original/recording paper detection means, and, in a case where the operation state stored in said non-volatile memory is "in-reading" when the power supply is turned on, performing control not to discharge the original even if the original is detected by said original/recording paper detection means.

5. An image communication apparatus according to claim 4, wherein said original/recording paper transportation mechanism is a mechanism which includes at least one of an edge sensor, a driving motor and a transportation roller.

6. An image communication apparatus according to claim 4, wherein said non-volatile memory is a memory which is backed up by a battery.

7. An image communication apparatus according to claim 4, wherein said image communication apparatus is a facsimile machine.

8. An image communication apparatus comprising:
an original/recording paper transportation mechanism for transporting an original or a recording paper when a reading operation or a recording operation is performed;
original/recording paper detection means for detecting whether or not the original or the recording paper exists in said original/recording paper transportation mechanism;
a non-volatile memory;
operation state storage control means for causing said non-volatile memory to store an operation state of said image communication apparatus; and
control means for, in a case where the operation state stored in said non-volatile memory is not "in-reading" when a power supply is turned on, performing control to discharge the recording paper if the recording paper is detected by said original/recording paper detection means, and, in a case where the operation state stored in said non-volatile memory is "in-reading" when the power supply is turned on, performing control not to discharge the original and control to display a message to urge a user to remove the original even if the original is detected by said original/recording paper detection means.

9. An image communication apparatus according to claim 8, wherein said original/recording paper transportation mechanism is at least one of an edge sensor, a driving motor and a transportation roller.

10. An image communication apparatus according to claim 8, wherein said non-volatile memory is a memory which is backed up by a battery.

11. An image communication apparatus according to claim 8, wherein said image communication apparatus is a facsimile machine.

12. A control method for an image communication apparatus, said method comprising:
a detecting step of causing an edge sensor to detect a position of an original or a recording paper when a reading operation or a recording operation is performed;
an original/recording paper detection step of detecting, based on an output signal from the edge sensor, whether or not the original or the recording paper exists in an original/recording paper transportation mechanism;
an operation state storage control step of causing a non-volatile memory to store an operation state of the image communication apparatus; and
a control step of, in a case where the operation state stored in the non-volatile memory is not "in-reading" when a power supply is turned on, performing control to discharge the recording paper if the recording paper is detected in said original/recording paper detection step, and, in a case where the operation state stored in the non-volatile memory is "in-reading" when the power supply is turned on, performing control not to discharge the original even if the original is detected in said original/recording paper detection step.

13. A control method according to claim 12, wherein the non-volatile memory is a memory which is backed up by a battery.

14. A control method according to claim 12, wherein the image communication apparatus is a facsimile machine.

15. A control method for an image communication apparatus, said method comprising:
a transportation step of causing an original/recording paper transportation mechanism to transport an original or a recording paper when a reading operation or a recording operation is performed;
an original/recording paper detection step of detecting whether or not the original or the recording paper exists in the original/recording paper transportation mechanism;
an operation state storage control step of causing a non-volatile memory to store an operation state of the image communication apparatus; and
a control step of, in a case where the operation state stored in the non-volatile memory is not "in-reading" when a power supply is turned on, performing control to discharge the recording paper if the recording paper is detected in said original/recording paper detection step, and, in a case where the operation state stored in the non-volatile memory is "in-reading" when the power supply is turned on, performing control not to discharge the original even if the original is detected in said original/recording paper detection step.

16. A control method according to claim 15, wherein the original/recording paper transportation mechanism is a mechanism which includes at least one of an edge sensor, a driving motor and a transportation roller.

17. A control method according to claim 15, wherein the non-volatile memory is a memory which is backed up by a battery.

18. A control method according to claim 15, wherein the image communication apparatus is a facsimile machine.

19. A control method for an image communication apparatus, said method comprising:
   a transportation step of causing an original/recording paper transportation mechanism to transport an original or a recording paper when a reading operation or a recording operation is performed;
   an original/recording paper detection step of detecting whether or not the original or the recording paper exists in the original/recording paper transportation mechanism;
   an operation state storage control step of causing a non-volatile memory to store an operation state of the image communication apparatus; and
   a control step of, in a case where the operation state stored in the non-volatile memory is not "in-reading" when a power supply is turned on, performing control to discharge the recording paper if the recording paper is detected in said original/recording paper detection step, and, in a case where the operation state stored in the non-volatile memory is "in-reading" when the power supply is turned on, performing control not to discharge the original and control to display a message to urge a user to remove the original even if the original is detected in said original/recording paper detection step.

20. A control method according to claim 19, wherein the original/recording paper transportation mechanism is at least one of an edge sensor, a driving motor and a transportation roller.

21. A control method according to claim 19, wherein the non-volatile memory is a memory which is backed up by a battery.

22. A control method according to claim 19, wherein the image communication apparatus is a facsimile machine.

* * * * *